(12) United States Patent
Johns et al.

(10) Patent No.: US 7,657,667 B2
(45) Date of Patent: Feb. 2, 2010

(54) METHOD TO PROVIDE CACHE MANAGEMENT COMMANDS FOR A DMA CONTROLLER

(75) Inventors: Charles Ray Johns, Austin, TX (US); James Allan Kahle, Austin, TX (US); Peichun Peter Liu, Austin, TX (US); Thuong Quang Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1177 days.

(21) Appl. No.: 10/809,553

(22) Filed: Mar. 25, 2004

(65) Prior Publication Data

US 2005/0216610 A1 Sep. 29, 2005

(51) Int. Cl.
*G06F 13/28* (2006.01)
(52) U.S. Cl. .............. 710/22; 710/23; 710/24; 710/25; 710/26; 710/27; 710/28
(58) Field of Classification Search .............. 710/22–28
See application file for complete search history.

(56) References Cited

U.S. PATENT DOCUMENTS

| | | | |
|---|---|---|---|
| 5,822,616 A | 10/1998 | Hirooka | |
| 5,890,271 A | 4/1999 | Bromley et al. | |
| 5,893,165 A | 4/1999 | Ebrahim | |
| 5,953,538 A | 9/1999 | Duncan et al. | |
| 6,178,533 B1 | 1/2001 | Chang | |
| 6,182,111 B1 | 1/2001 | Inohara et al. | |
| 6,205,409 B1 | 3/2001 | Zvonar | |
| 6,219,759 B1 | 4/2001 | Kumakiri | |
| 6,247,094 B1 | 6/2001 | Kumar et al. | |
| 6,401,193 B1 | 6/2002 | Afsar et al. | |
| 6,427,201 B1 * | 7/2002 | Ohba | 712/22 |
| 6,526,491 B2 | 2/2003 | Suzuoki et al. | |
| 6,636,906 B1 | 10/2003 | Sharma et al. | |
| 6,658,537 B2 | 12/2003 | Hughes et al. | |

(Continued)

FOREIGN PATENT DOCUMENTS

JP 2001-109723 4/2001

(Continued)

OTHER PUBLICATIONS

"Microsoft Computer Dictionary : Fifth Edition," 2002, Microsoft Press, Fifth edition, p. 162.*

(Continued)

*Primary Examiner*—Niketa I Patel
*Assistant Examiner*—Chun-Kuan Lee
(74) *Attorney, Agent, or Firm*—Stephen R. Tkacs; Stephen J. Walder, Jr.; Matthew B. Talpis (57) ABSTRACT

The present invention provides a method and a system for providing cache management commands in a system supporting a DMA mechanism and caches. A DMA mechanism is set up by a processor. Software running on the processor generates cache management commands. The DMA mechanism carries out the commands, thereby enabling the software program management of the caches. The commands include commands for writing data to the cache, loading data from the cache, and for marking data in the cache as no longer needed. The cache can be a system cache or a DMA cache.

18 Claims, 4 Drawing Sheets

U.S. PATENT DOCUMENTS

| | | | |
|---|---|---|---|
| 6,681,296 B2 * | 1/2004 | Liao et al. | 711/129 |
| 6,693,846 B2 | 2/2004 | Fibranz | |
| 6,697,916 B2 | 2/2004 | Lasserre et al. | |
| 6,711,650 B1 | 3/2004 | Bohrer et al. | |
| 6,738,881 B1 * | 5/2004 | Ollivier et al. | 711/168 |
| 6,842,822 B2 | 1/2005 | Snyder et al. | |
| 6,874,039 B2 | 3/2005 | Ganapathy et al. | |
| 6,950,902 B2 | 9/2005 | Sakai et al. | |
| 7,010,626 B2 | 3/2006 | Kahle | |
| 7,114,042 B2 | 9/2006 | Day et al. | |
| 7,200,689 B2 | 4/2007 | Kahle | |
| 2001/0003838 A1 | 6/2001 | Hornung et al. | |
| 2002/0038393 A1 | 3/2002 | Ganapathy et al. | |
| 2003/0154349 A1 | 8/2003 | Berg et al. | |
| 2004/0193754 A1 | 9/2004 | Kahle | |
| 2005/0027899 A1 | 2/2005 | Kahle | |
| 2005/0033874 A1 * | 2/2005 | Futral et al. | 710/22 |
| 2005/0210204 A1 | 9/2005 | Yamazaki | |

FOREIGN PATENT DOCUMENTS

JP  2004-326633  11/2004

OTHER PUBLICATIONS

"PowerPC Architecture", International Business Machines Corporation, First Edition, International Thomson Publishing Japan, Dec. 20, 1995, pp. 300-303, 380-381 (in Japanese).

* cited by examiner

METHOD TO PROVIDE CACHE MANAGEMENT COMMANDS FOR A DMA CONTROLLER

RELATED APPLICATIONS

This application relates to co-pending U.S. patent applications entitled "DMA Prefetch" (Ser. No. 10/401,411), filed on Mar. 27, 2003, and "Cacheable DMA" (Ser. No. 10/631,590), filed on Jul. 31, 2003.

TECHNICAL FIELD

The invention relates generally to memory management and, more particularly, to the software program management of caches through the use of a direct memory access (DMA) mechanism.

BACKGROUND

In a multiprocessor design, a DMA mechanism such as a DMA engine or DMA controller is used to move information from one type of memory to another memory type, which is not inclusive of the first memory type (for example a cache), or from one memory location to another. In particular, a DMA mechanism moves information from a system memory to a local store of a processor. When a DMA controller tries to move information from a system memory to a local store of the processor, there can be delay in fetching and loading the information from the memory to the local store of the processor. Moving the information can consume multiple processor cycles. The delay is an accumulation of many factors, including memory latencies and coherency actions within a multiprocessor system. Even in a single processor system, memory access can consume a large number of cycles. In a multiprocessor system with multiple types of memories and relatively large distances between some of the memories and processors, the problem of a processor or DMA controller waiting for memory access is even worse.

A processor can be provided with a cache to help reduce the delay in access to the memory for the processor, thus improving the performance of software running on the processor. The processor may provide instructions for managing the cache to further improve the performance.

Therefore, a need exists in a multiprocessor system for the software program management of caches through the use of a direct memory access (DMA) mechanism, to reduce the latency of memory access on DMA transfers.

SUMMARY OF THE INVENTION

The present invention provides a method and a system for providing cache management commands in a system supporting a DMA mechanism and caches. A DMA mechanism is set up by a processor. Software running on the processor generates cache management commands. The DMA mechanism carries out the commands, thereby enabling the software program management of the caches.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be apparent to those skilled in the art that the present invention may be practiced without such specific details. In other instances, well-known elements have been illustrated in schematic or block diagram form in order not to obscure the present invention in unnecessary detail.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
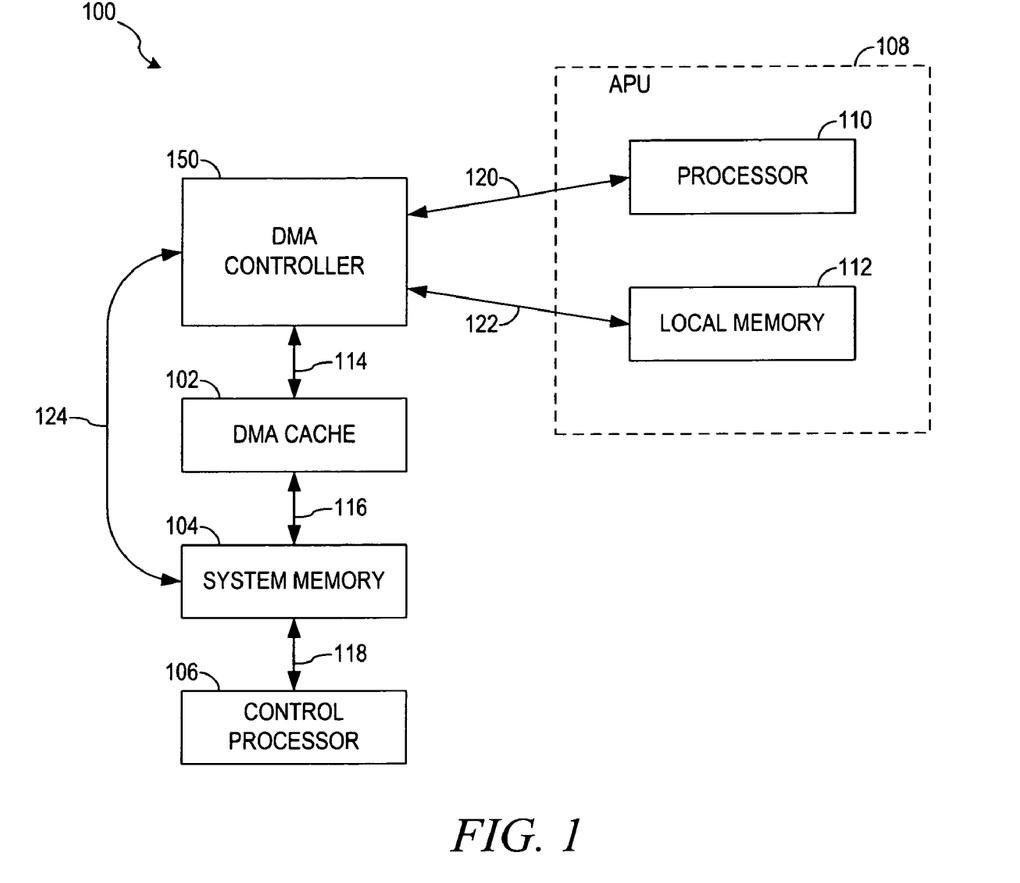
FIG. 1 shows a block diagram illustrating an asymmetric heterogeneous multiprocessor computer system with a cacheable DMA mechanism and a DMA cache.

FIG. 1 shows a block diagram illustrating an asymmetric heterogeneous multiprocessor computer system with a cacheable DMA mechanism and a DMA cache. A DMA mechanism with cache will be called a cacheable DMA mechanism, and its cache, the DMA cache.

The asymmetric heterogeneous multiprocessor computer system 100 is comprised of one or more control processors 106 (PUs) in a classic multiprocessor arrangement with common shared memory or system memory 104 tightly coupled to one or more associated asymmetric processors 108 (APUs), each comprising a processor 110 and a local memory 112, through a cacheable DMA mechanism.

The APUs 108 have indirect access to the common shared memory or system memory 104 through DMA operations to and from their local memory 112. The DMA operations are performed by the DMA controller 150. The DMA controller 150 is connected to the DMA cache 102 by a connection 114 and the DMA cache 102 is connected to the system memory 104 by a connection 116. The DMA controller 150 is also directly connected to the system memory 104 by a connection 124.

The processor 110 of the APU 108 and local memory 112 of the APU 108 are each connected to the DMA controller 150, by connections 120 and 122, respectively.

In an alternative embodiment, the DMA controller 150 is further directly connected to the PU 106. This connection is used to allow the PU 106 to issue DMA commands and DMA cache management commands. This connection provides more flexibility for the software. In the alternative embodiment with this direct connection between the DMA controller 150 and the PU 106, there is also an associated DMA command queue added to the DMA controller 150 for the commands issued by the PU 106. See the discussion of FIG. 2, below, for more information about DMA command queues. A selection mux between the two queues, not shown, (APU queue and PU queue) to determine the order of execution of the commands in the two queues is also added. Any selection method can be used, for example, round robin.

In an alternative embodiment, one or more additional caches may be used to interface with all the PUs 106. This cache or caches would be connected to the PUs 106 and to the system memory. In an alternative embodiment, there is no DMA cache, but there are one or more caches connected to the PUs 106 and to the system memory 104. Commands executing on the DMA controller 150 affect the operation of the cache or caches connected to the PUs 106 and to the system memory 104.

Data is fetched to the DMA cache 102. When the DMA controller 150 requests data that is stored in the DMA cache 102, the DMA controller 150 does not have to go all the way back to the system memory 104 to retrieve the data. Instead, the DMA controller 150 accesses the DMA cache 102 to retrieve the data and transfer the data to the local memory 112. Transferring data between the DMA cache 102 and local memory 112 is many times faster than transferring it between the system memory 104 and the local memory 112. As a result, the programs running on the processor 110 can operate much faster.

Figure 2:
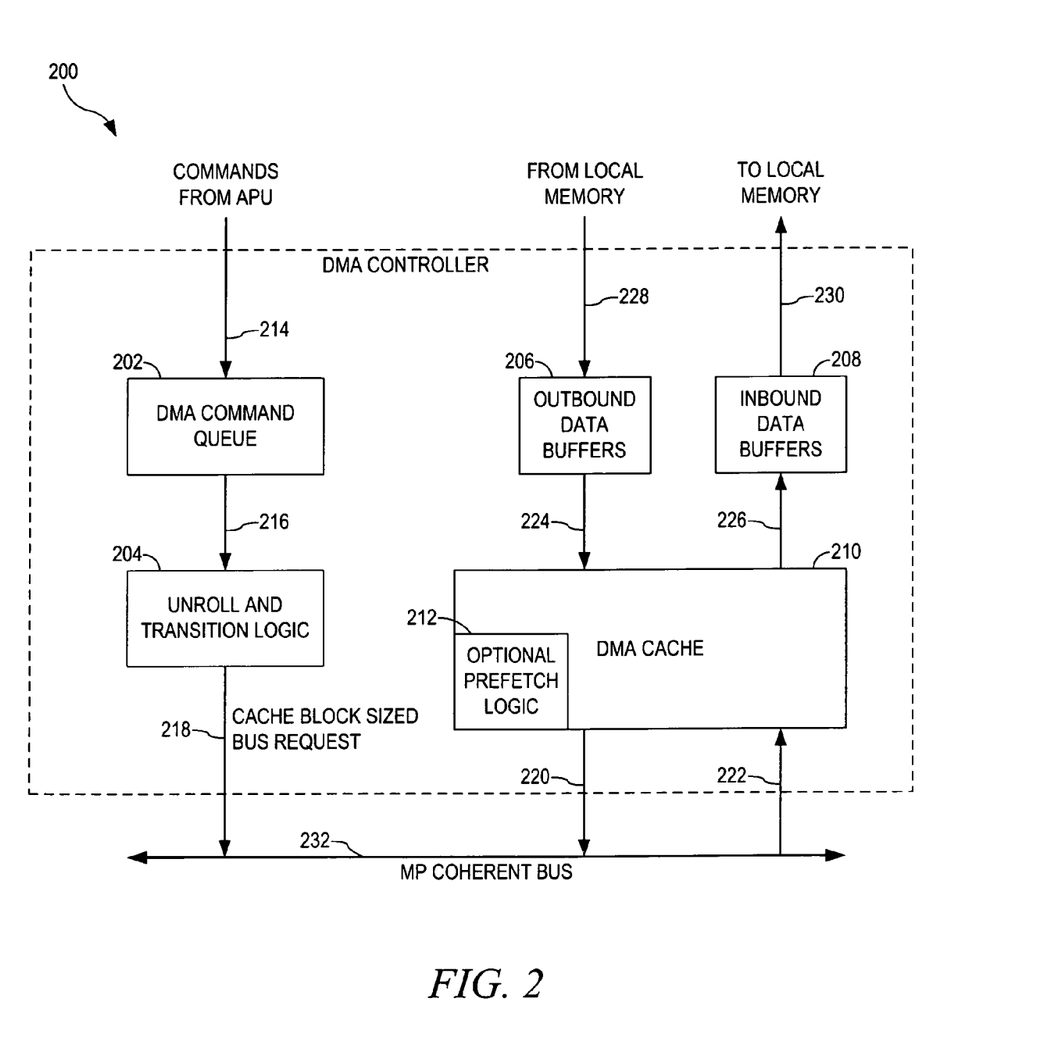
FIG. 2 shows a block diagram illustrating an expanded view of a DMA controller configured to execute DMA commands for cache management.

FIG. 2 is a block diagram illustrating an expanded view of a DMA controller 200 configured to execute a cache management command produced by software running on the APU 108 or PU 106. Software running on the APU 108 or PU 106 generates commands for controlling operation of the DMA cache 210. The commands are sent from the APU 108 or PU 106 to the DMA controller 200, and then executed. As a result, the software program running on the APU 108 or PU 106 controls the management of the DMA cache 210.

The DMA controller 200 receives commands from an APU 108 via a connection 214. The commands can be placed in a DMA command queue 202. Parameters associated with the command provide information such as transfer size, tag, and addressing information. The DMA controller unroll and translation logic component 204 unrolls and translates the DMA operation described by the DMA command and its parameters into one or more smaller bus requests 218 until the full transfer length is satisfied. The unrolling and the issuance of bus requests can be done in parallel. The bus requests pass along a multiprocessor coherent bus (MP coherent bus) 232 which is coupled to the DMA data cache 210, and to other memories, such as the local memory 112 and the system memory 104. Data passes back and forth between the DMA data cache 210 and the local memory 112 through the inbound data buffer 208 and the outbound data buffer 206 through connections 224, 226, 228 and 230. The MP coherent bus requests, data transfer, and the issuance of the next bus request can all be done in parallel.

The commands for the management of caches include commands for storing data in a cache, for writing data from a cache, zeroing out data in a cache, and for marking data in a cache as no longer needed. The parameters of the commands specify the locations of data to be stored or written and other information. When a DMA cache 210 is implemented, the execution of the commands by the DMA controller 200 will manage the operation of the DMA cache 210. These commands can be used even if a DMA cache is not implemented. In such an embodiment, the execution of the commands by the DMA controller 200 would affect other caches which hold data that the DMA controller is transferring.

In one embodiment of the invention, parameters include the class line (CL), the tag (TG), transfer size (TS), effective address high (EAH), and effective address low (EAL). TS indicates the number of bytes of data that the command operates on. The cache management control commands all have an implied tag specific barrier. The implied tag specific barrier prevents the cache management control command and all subsequently issued commands, with the same tag ID, from executing until all previously issued commands, with the same tag ID, have completed. EAH and EAL are combined or concatenated to produce an effective address. In one implementation, the EAH is the upper 32 bits of an address and EAL is the lower 32. Concatenating them produces a 64-bit address. The specific commands include:

1. Data_cache_range_touch

This command comprises an indication to the DMA controller 200 that a get (that is, a load) command will probably be issued for the address range specified by this command. The DMA controller 200 attempts to bring the range of data identified by the effective address and transfer size into the associated DMA cache. This command can be used in an embodiment without a DMA cache to cause other system caches to store modified data to system memory for storage that is Memory Coherency Required. Storing the modified data to system memory can reduce the latency of future DMA transfers. The store does not necessarily invalidate the line in the other caches. This command can also be used for software maintained coherency.

2. data_cache_range_touch_for_store

This command comprises an indication to the DMA controller 200 that a put (that is, a store) command will probably be issued for the address range specified by this command. The DMA controller 200 attempts to bring the range of data identified by the effective address and transfer size into the associated DMA cache. In contrast with command 1, this command informs the DMA controller 200 that there is an intention to modify the data. A multiprocessor system can use this knowledge to mark invalid (invalidate) copies of the data in other system caches, so that the current cache is the sole owner of the data. The sole owner of the data can modify the data without having to perform any coherency actions. This command can be used in an embodiment without a DMA cache to cause other system caches to flush modified data to system memory for storage that is Memory Coherency Required. Flushing the modified data to system memory can reduce the latency of future DMA transfers. The flush invalidates the line in the other caches. This command can also be used for software maintained coherency.

3. data_cache_range_set_to_zero

This command sets the range of storage specified by the effective address and transfer size to zero. In an embodiment with a DMA cache, this command causes the DMA controller 200 to get ownership of the cache-lines associated with the area of system memory and zero the data in the DMA cache. The area of system memory is effectively zeroed. This command can be used in an embodiment without a DMA cache to zero an area of system memory. In an embodiment without a DMA cache, the area of system memory is written with zeros.

4. data_cache_range_store

If the data block specified by the effective address and transfer size is considered modified, it is written to main storage. It is modified if it is modified in the DMA cache of the associated processor, or if the storage is Memory Coherency Required and it is modified in any cache in the system. The data blocks may remain in the cache, but cease to be considered modified. This command can be used in an embodiment without a DMA cache to cause other system caches to store modified data to system memory for storage that is Memory Coherency Required. Storing the modified data to system memory can reduce the latency of future DMA transfers. The store does not necessarily invalidate the line in the other caches. This command can also be used for software maintained coherency.

5. data_cache_range_flush

If the storage is Memory Coherency Required, and a data block specified by the effective address and transfer size is modified in any cache in the system, the data block is written to main storage and invalidated in the caches of all processors. If the storage is Memory Coherency Required, and the data blocks specified by the effective address and transfer size are valid in any cache, the associated cache blocks are invalidated.

If the storage is not Memory Coherency Required and a data block is modified in the DMA cache for the issuing APU, the modified blocks are written to main storage and are invalidated in the DMA cache of the issuing APU. If the storage is not Memory Coherency Required and the data blocks are valid in the DMA cache of the issuing APU, the line is invalidated in the DMA cache associated with the DMA controller.

This command can be used in an embodiment without a DMA cache to cause other system caches to flush modified data to system memory. Flushing the modified data to system memory can reduce the latency of future DMA transfers. The flush invalidates the line in the other caches. This command can also be used for software maintained coherency.

Many alternative or additional commands and command forms could be used. One skilled in the art can easily define additional DMA commands. These include, but are not limited to, a data_cache_range_invalidate and strided command forms. A strided touch, for example, accesses non-consecutive blocks of data; for example, access 8 blocks, skip 64 blocks, access 8 blocks, skip 64 blocks. Strided touches can be useful in graphics and matrix operations. In addition, different forms of flush or store could be used. More generally, the DMA command set can be extended to perform the same functions for cache management that are found in processors today.

Other parameters could be used for the same or other DMA controller architectures. For instance, the commands could reference real addresses instead of effective addresses, or not include tags. The commands could reference the beginning and end address of data to be transferred, rather than the beginning address and transfer size. More simply, the commands could operate on a fixed block size of data at a time. In that case, no transfer size parameter or the equivalent would be necessary.

There can be many different forms of DMA commands for controlling a DMA cache, and many different ways of executing the commands. The parameters could include other information, or could contain only addressing information. If the commands operate on single blocks of data, then there is no need for unrolling the command into one or more, smaller bus requests. Each command would generate a bus request.

Figure 3:
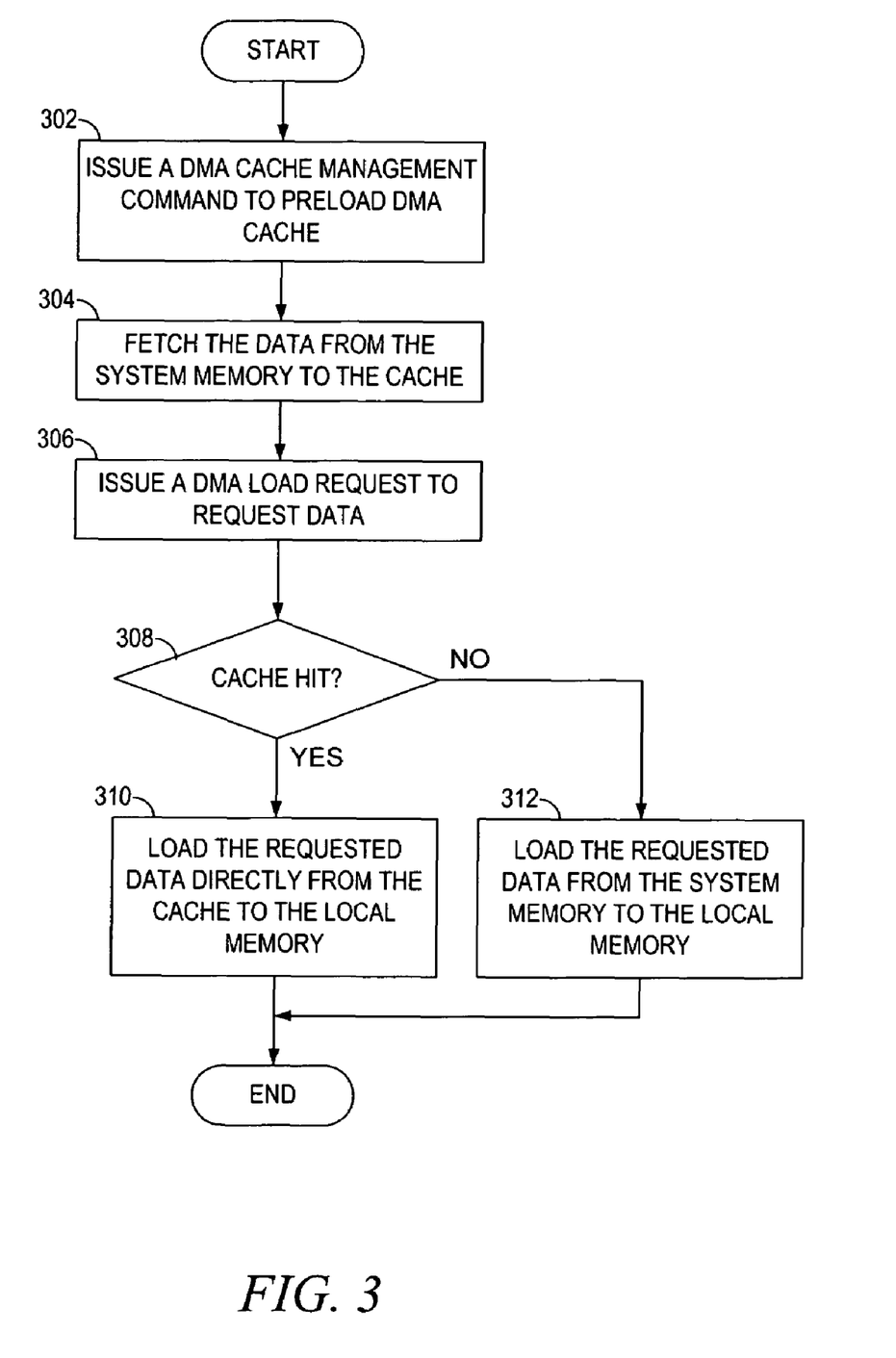
FIG. 3 shows a flow diagram illustrating the operation of a caching mechanism applicable to a DMA mechanism as shown in FIG. 1 and FIG. 2.

Now referring to FIG. 3, shown is a flow diagram illustrating the operation of a caching mechanism for a DMA load, applicable to a cacheable DMA mechanism as shown in FIG. 1. FIG. 3 includes a step for pre-fetching data into a DMA cache using a cache management command.

In step 302, a DMA cache management command is issued to pre-fetch data into the DMA cache 102. In step 304, the DMA mechanism begins to perform a data transfer from a system memory to the DMA cache 102. For example, turning to FIG. 1, the DMA controller 150 performs a data transfer from the system memory 104 to the DMA cache 102. Returning to FIG. 3, in step 306, a DMA load request is issued to request data from the system memory. In step 308, it is determined whether the requested data is found in the DMA cache 102. If the requested data is found in the DMA cache 102 in step 308 (a cache hit), the process goes to step 310, where the requested data is loaded directly from the DMA cache 102 to the local memory 112. If the requested data is not found in the DMA cache 102 in step 308 (a cache miss), the process continues to step 312, where the requested data is loaded from the system memory 104 to the local memory 112.

As a result of the DMA cache management command issued in step 302 and the transfers performed in step 304, the probability of a cache hit in step 308 is much higher than if steps 302 and 304 were not performed. Accordingly, the provision of the cache management commands, and the generation of cache management commands by software programs executing on the APU 108, enable more effective use of the DMA cache 102. The program can know in advance which data from the system memory 104 will be needed, and issue cache management commands to the DMA controller 150 to preload that data into the DMA cache 102, where the software program will have fast access to it. As a result, much of the latency of waiting for the retrieval of data is eliminated. Without the provision of these cache management commands, the data that is requested by the APU 108 might rarely be found in the DMA cache 102.

While FIG. 3 illustrates only one use (pre-fetch for a DMA load) of the cache management commands, one skilled in the art can develop similar flows for the management of caches for other DMA operations (for example, DMA stores). In addition, the cache management commands can also be used for other system operations (for example, software managed cache coherency and I/O transfers).

There can be different ways to write data to the local memory 112 and back to the system memory 104 without departing from the true spirit of the present invention. For example, the data may be written back to the system memory 104 via the DMA cache 102. Alternatively, the data may be directly written back to the system memory 104 without going through the DMA cache 102. In the latter case, the cache entry for the data being written back to the system memory 116 may be invalidated. Similarly, when data requested from the system memory 116 is not found on the DMA cache 102, it can be written to the DMA cache 102 and to the local memory 112, or written only to the local memory 112, or written only to the DMA cache 102. In the latter case, two steps are needed, in place of step 312, to load the data into local memory 112. In the first step, data is brought into the DMA cache 102. The second step is the same as step 310. In this step, the requested data is loaded from the DMA cache 102 into local memory 112. These and other details on the process of writing data to the local memory 112 and back to the system memory 104 are not further disclosed herein.

Figure 4:
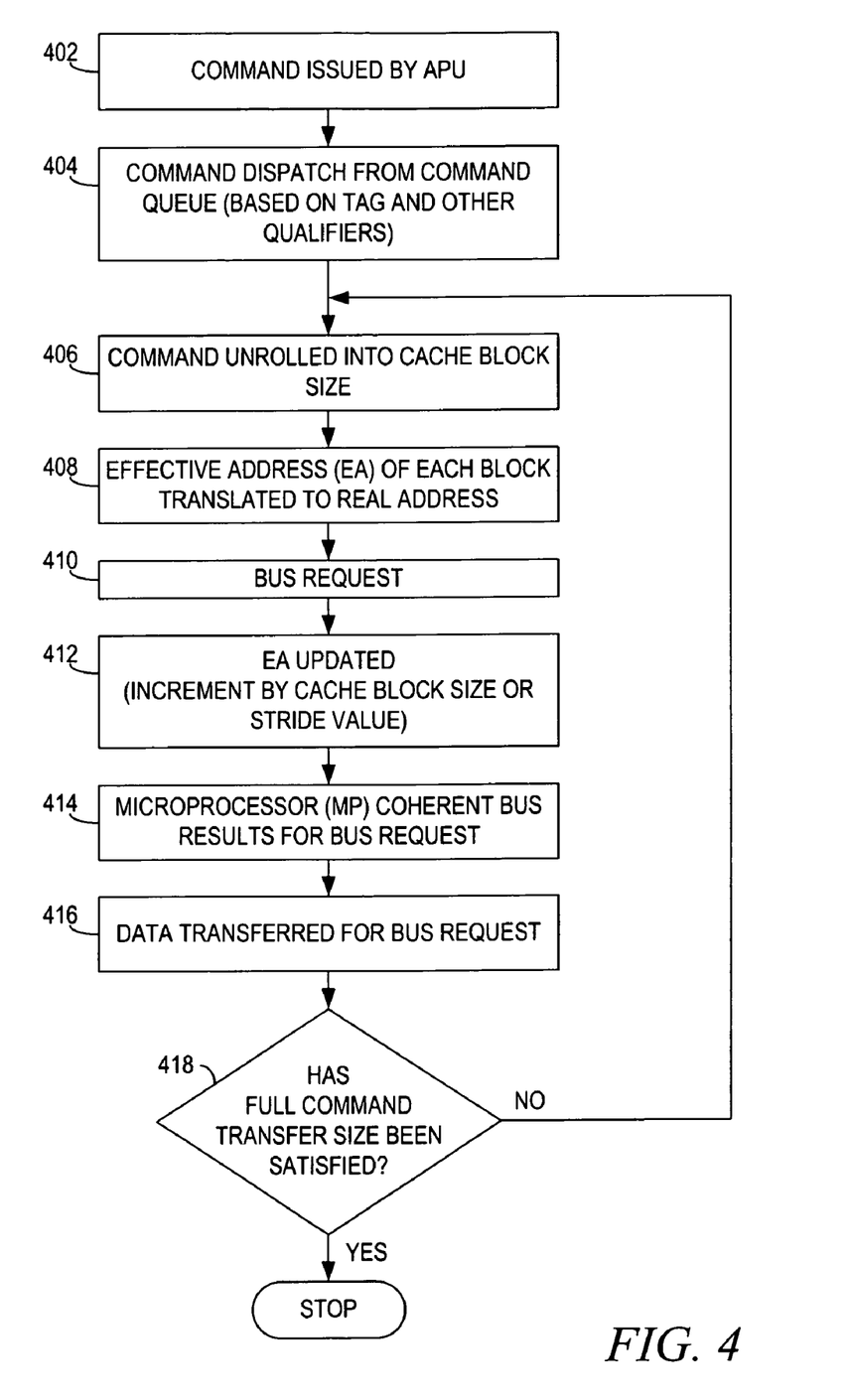
FIG. 4 shows a flow diagram illustrating the unrolling of a command for the management of a DMA cache.

FIG. 4 is a flow chart illustrating the unrolling of a DMA command in one embodiment of the invention. In step 402, commands are issued by an APU 108, or other processor, connected to a DMA controller 150 and are stored in the DMA command queue 202. For example, in FIG. 1, the APU 108 issues commands to the DMA controller 150. Turning back to FIG. 4, in step 404, a command is dispatched from the DMA command queue 202 (based on tag and other qualifiers). In an alternate embodiment where the DMA controller 150 is also directly connected to the control processor 106, and there are two processor DMA queues, the commands and tags are only considered for the associated queue. Another step is also necessary to select between the commands dispatched from each queue. In other embodiments, the DMA controller processes one command at a time, and the command parameters can reference other parameters of the data being stored and fetched.

In step 406, the command is unrolled into a cache block size subcommand, using the unroll and translation logic 204. Steps 408 through 414 present the substeps of step 406. In step 408, the Effective Address (EA) of each block is translated to a Real Address for a command of the right size. In step 410, a bus request is issued for the block of data. In step 412, the EA is updated (incremented by cache block size or stride value). The update of the EA and the issue of the next bus request can be done in parallel. In step 414, the MP coherent bus results for the bus request are obtained. In step 416, the data is transferred for the bus request. The MP Coherent bus results, data transfer, and the issue of the next bus request can all be done in parallel. In step 418, steps 406 through 416 are repeated until the full transfer size of the command has been satisfied.

In other embodiments, the commands can refer to single blocks of data for which unrolling would not be necessary. In other embodiments, the command could use the real address rather than the effective address as a parameter, or any other parameter referring to an address for the affected data. In other embodiments, the bus would not be an MP coherent bus, but any suitable bus or buses for transferring data as requested among the various system storage devices.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A system to provide software program control of cache management, comprising:
    a control processor;
    one or more asymmetric processors;
    a shared system memory;
    one or more local memories, wherein each of the one or more local memories is associated with a respective one of the one or more asymmetric processors;
    a direct memory access (DMA) controller coupled to the control processor and the one or more asymmetric processors, configured to execute DMA commands for moving data between the shared system memory and the one or more local memories; and
    a DMA cache coupled to the DMA controller configured to cache data being moved between the shared system memory and the one or more local memories;
    wherein the control processor is configured to generate DMA cache management commands for the management of the DMA cache;
    wherein the DMA cache management commands comprise at least one of a data cache range touch command that indicates to the DMA controller that the control processor will probably issue a get command for a specified address range, a data cache range touch for store command that indicates to the DMA controller that the control processor will probably issue a put command for a specified address range, a data cache range set to zero command that sets a range of storage specified by an effective address and transfer size to zero, a data cache range store command that indicates a data block specified by an effective address and transfer size to be written to the shared system memory if the data block is considered modified, and a data cache range flush command that indicates a data block specified by an effective address and transfer size to be written to the shared system memory and invalidated in caches of all processors if memory coherency is required and the data block is modified.

2. The system of claim 1, wherein responsive to receiving the data cache range touch command, the DMA controller attempts to bring the range of data identified by an effective address and transfer size of the darn cache range touch command into the DMA cache.

3. The system of claim 1, wherein responsive to receiving the data cache range touch for store command, the DMA controller attempts to bring the range of data identified by an effective address and transfer size of the data cache range touch for store command into the DMA cache.

4. The system of claim 1, wherein responsive to receiving the data cache range set to zero command, the DMA controller gets ownership of cache lines associated with an area of the shred system memory and zeroes data in the DMA cache such that the area of shared system memory is effectively zeroed.

5. The system of claim 1, wherein responsive to receiving the data cache range store command, the DMA controller writes the data block to the shred system memory if the data block is modified.

6. The system of claim 1, wherein responsive to receiving the data cache range flush command, the DMA controller writes the data block to the shared memory and invalidates the data block in caches of all processors if memory coherency is required and the data block is modified.

7. A method for cache management in a system comprising a DMA controller and a processor, the method comprising the steps of:
    running software on a control processor to generate direct memory access (DMA) commands for moving data between a shared system memory and one or more local memories, wherein each of the one or more local memories is associated with a respective one of one or more asymmetric processors;
    issuing the DMA commands to the DMA controller; and
    executing the DMA commands, wherein the DMA controller is coupled to a DMA cache configured to cache data being moved between the shared system memory and the one or more local memories,
    wherein the control processor is configured to generate DMA cache management commands for the management of the DMA cache;
    wherein the DMA cache management commands comprise at least one of a data cache range touch command that indicates to the DMA controller that the control processor will probably issue a get command for a specified address range, a data cache range touch for store command that indicates to the DMA controller that the control processor will probably issue a put command for a specified address range, a data cache range set to zero command that sets a range of storage specified by an effective address and transfer size to zero, a data cache range store command that indicates a data block specified by an effective address and transfer size to be written to the shared system memory if the data block is considered modified, and a data cache range flush command that indicates a data block specified by an effective address and transfer size to be written to the shared system memory and invalidated in caches of all processors if memory coherency is required and the data block is modified.

8. The method of claim 7, wherein responsive to receiving the data cache range touch command, the DMA controller attempts to bring the range of data identified by an effective address and transfer size of the data cache range touch command into the DMA cache.

9. The method of claim 7, wherein responsive to receiving the data cache range touch for store command, the DMA controller attempts to bring the range of data identified by an effective address and transfer size of the data cache range touch for store command into the DMA cache.

10. The method of claim 7, wherein responsive to receiving the data cache range set to zero command, the DMA controller gets ownership of cache lines associated with an area of the shred system memory and zeroes data in the DMA cache such that the area of shred system memory is effectively zeroed.

11. The method of claim 7, wherein responsive to receiving the data cache range store command, the DMA controller writes the data block to the shared system memory if the data block is modified.

12. The method of claim 7, wherein responsive to receiving the data cache range flush command, the DMA controller writes the data block to the shared memory and invalidates the data block in caches of all processors if memory coherency is requited and the data block is modified.

13. A computer program product for cache management in a system comprising a DMA controller and a processor, the computer program product having a computer storage medium with a computer program embodied thereon, the computer program comprising:

computer code for running software on a control processor to generate DMA commands for moving data between a shared system memory and one or more local memories, wherein each of the one or more local memories is associated with a respective one of one or more asymmetric processors;

computer code for issuing the DMA commands to the DMA controller; and computer code for executing the DMA commands, wherein the DMA controller is coupled to a DMA cache configured to cache data being moved between the shared system memory and the one or more local memories, wherein the control processor is configured to generate DMA cache management commands for the management of the DMA cache;

wherein the DMA cache management commands comprise at least one of a data cache range touch command that indicates to the DMA controller that the control processor will probably issue a act command for a specified address range, a data cache range touch for store command that indicates to the DMA controller that the control processor will probably issue a put command for a specified address range, a data cache range set to zero command that sets a range of storage specified by an effective address and transfer size to zero, a data cache range store command that indicates a data block specified by an effective address and transfer size to be written to the shared system memory if the data block is considered modified, and a data cache range flush command that indicates a data block specified by an effective address and transfer size to be written to the shred system memory and invalidated in caches of all processors if memory coherency is required and the data block is modified.

14. The computer program product of claim 13, wherein responsive to receiving the data cache range touch command, the DMA controller attempts to bring the range of data identified by an effective address and transfer size of the data cache range touch command into the DMA cache.

15. The computer program product of claim 13, wherein responsive to receiving the data cache range touch for store command, the DMA controller attempts to bring the range of data identified by an effective address and transfer size of the data cache range touch for store command into the DMA cache.

16. The computer program product of claim 13, wherein responsive to receiving the data cache range set to zero command, the DMA controller gets ownership of cache lines associated with an area of the shared system memory and zeroes data in the DMA cache such that the area of shared system memory is effectively zeroed.

17. The computer program product of claim 13, wherein responsive to receiving the data cache range store command, the DMA controller writes the data block to the shred system memory if the data block is modified.

18. The computer program product of claim 13, wherein responsive to receiving the data cache range flush command, the DMA controller writes the data block to the shared memory and invalidates the data block in caches of all processors if memory coherency is required and the data block is modified.

* * * * *

UNITED STATES PATENT AND TRADEMARK OFFICE
CERTIFICATE OF CORRECTION

PATENT NO. : 7,657,667 B2
APPLICATION NO. : 10/809553
DATED : February 2, 2010
INVENTOR(S) : Johns et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1388 days.

Signed and Sealed this

Thirtieth Day of November, 2010

David J. Kappos
*Director of the United States Patent and Trademark Office*